Dec. 21, 1965     L. N. SCHUMAN     3,224,179
MOWER GUARD
Filed May 20, 1963     2 Sheets-Sheet 1
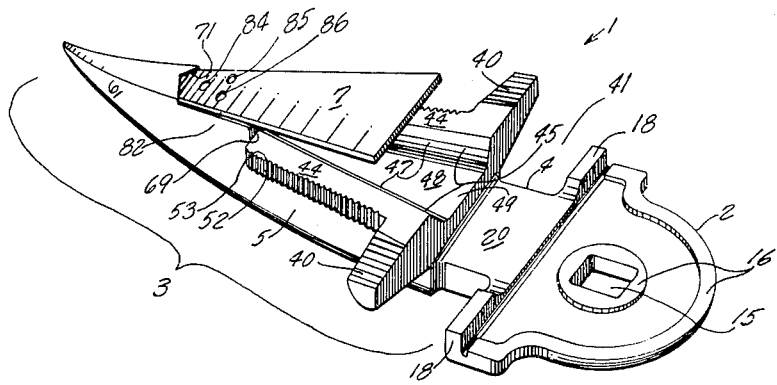
Fig. 1
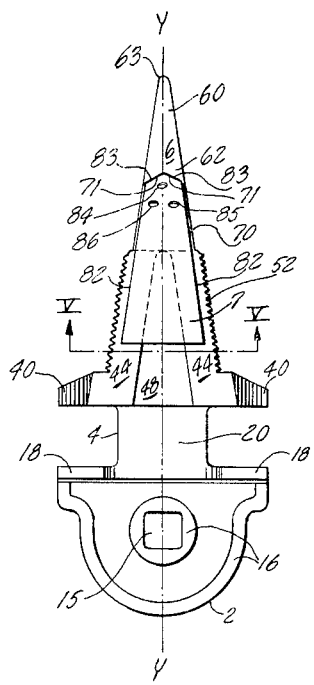
Fig. 2     Fig. 3     Fig. 4
INVENTOR.
LESLIE N. SCHUMAN
BY
ATTORNEY Dec. 21, 1965   L. N. SCHUMAN   3,224,179
MOWER GUARD Filed May 20, 1963   2 Sheets-Sheet 2

INVENTOR.
LESLIE N. SCHUMAN
BY
Henry Kozak
ATTORNEY

United States Patent Office 3,224,179
Patented Dec. 21, 1965

3,224,179
MOWER GUARD
Leslie N. Schuman, Brecksville, Ohio, assignor, by mesne assignments, to Midland-Ross Corporation, Cleveland, Ohio, a corporation of Ohio
Filed May 20, 1963, Ser. No. 281,687
8 Claims. (Cl. 56—310)

This invention relates to mower guards for reciprocating cutters of an agricultural mowing machine, and more particularly to mower guards having a self-sharpening cutting edge.

Many of the mower guards for harvesting machines on the market today are cast from standard malleable iron. These guards have secured to their fingers, hardened steel ledger plates, which cooperate with a reciprocating knife to secure a shear cut.

A major disadvantage in a mower guard utilizing a ledger plate is that, after a period of use, the top surface of the ledger plate in close proximity to the cutting edge becomes worn. That is, the top surface of the ledger plate is no longer flat but becomes beveled near both cutting edges. Such a wearing trait has the effect of producing, in cooperation with the reciprocating knife, a tearing or ripping action upon the stems of the crop being cut rather than a shearing or cutting action. In addition, wear upon the blades of the knife is accelerated. Another disadvantage is that the ledger plate itself becomes loose after a period of time as the fastening means, such as rivets or studs by which the plate is attached to the guard, become worn or damaged. This not only effects the cutting ability of the mower but it also decreases the expected service life of the mower guards and the knife. The invention as disclosed hereinafter substantially eliminates this ledger plate problem.

Another problem associated with standard malleable iron harvester guards not heretofore recognized, was the contribution of the general construction of the finger portion to defects and unsatisfactory service. Previously, the shoe of the finger was either T-shaped, semi-elliptical, or rectangular in transverse cross-section. Such construction, when too thick, resulted in such defects as warping or cracking during cooling of the castings, and when too thin, provided insufficient strength to resist breakage from horizontal impacts on the guard.

It is therefore the primary object of this invention to provide a mower guard having an integral ledger surface in lieu of the conventional ledger plate providing cutting edges which retain their sharpness by action thereon of a reciprocating knife with which the mower guard is used.

A further object is to provide a mower guard having a variable abrasive-resistant ledger-wearing surface.

Still another object of the invention is to provide a mower guard having improved strength in proportion to its weight.

Another object is to provide a mower guard having a greater resistance to bending and fracturing under combined horizontal and vertical loads.

A further object is to provide a mower guard design that may be readily cast in accordance with modern foundary practices with freedom from defects, such as shrinkage, warping and cracks.

It is a further object to provide a mower guard having improved guiding characteristics.

Another object is to provide a cast malleable mower guard finger with a steel lip projection welded thereto.

The above objects and others apparent hereinbelow are fulfilled in a mower guard comprising pearlitic malleable cast iron which is utilized to provide advantageous differences in hardness within the mower guard enabling its use without the conventional ledger plate. In preferred embodiments, the ledger surface which replaces the conventional ledger plate has maximum hardness along the cutting edges formed thereby; the ledger surface slopes away from a plane containing both cutting edges; or the finger portion of the guard which tapers forwardly in the cutting direction has a pair of spaced longitudinally convergent under-ribs or shoes.

In the drawings, with respect to which the invention is described below:

FIG. 1 is a perspective view of the mower guard in accordance with the invention.

FIG. 2 is a top view of the guard shown in FIG. 1.

FIG. 3 is a bottom view of FIG. 1.

FIG. 4 is a fragmentary top view of a modified mower guard.

Figure 5:
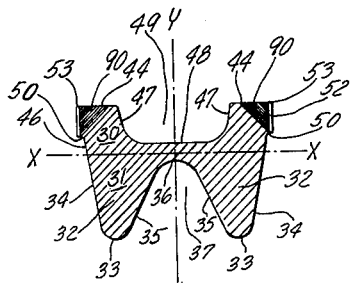
FIG. 5 is an enlarged elevation in transverse section taken along line V—V of the guard shown in FIG. 2.

Referring to the embodiment of FIG. 1, a mower guard 1 is shown comprising a rear anchorage portion 2, a finger portion 3 including a neck 4, a body 5, a forward guiding nose 6, and a lip 7. In a preferred form, the mower guard comprises pearlitic malleable iron.

As shown also in FIG. 3, the anchorage portion 2 may be of a standard design for attaching the guard to a mower guard bar (not shown). The anchorage portion is provided with an approximately centrally located polygonal opening or aperture 15 extending downwardly from the guard bar abutment surface 16 to receive a bolt for attaching the guard to the guard bar. A surface 17 on the bottom of the anchor portion is recessed in alignment with the aperture to receive the bolt head. In order to prohibit the turning of the guard about the bolt, the forward edge of the anchorage portion has extending upwardly from surface 16, a pair of equidistantly laterally spaced vertical lugs 18 which cooperate with the bolt to maintain the guard in a fixed relation to the guard bar.

Finger portion 3 is joined by its neck 4 to the anchorage portion 2. The neck has a bottom surface 19 which is contained in the same horizontal plane as the bottom surface 17 of anchorage portion 2. Top surface 20 of neck 4 is contained in substantially the same horizontal plane as surface 16 of anchorage portion 2.

The body 5 comprises an upper and a lower portion 30 and 31, respectively, divided by a horizontal plane X—X extending from the rearward portion of the body 5 forwardly toward nose 6. Plane X—X when extended rearwardly toward anchorage portion 2, lies slightly above top surface 20 of neck 4. Lower portion 31 connects the body 5 through neck 4 to anchorage portion 2.

A centrally located longitudinal vertical plane Y—Y extending from aperture 15 forwardly toward nose 6 divides the mower guard symmetrically as best seen in FIGS. 2 and 3.

The lower portion comprises two V-shaped co-depending shoes 32 laterally spaced from the vertical plane Y—Y. Each shoe 32 has a bottom wearing surface 33 extending from the bottom surface of the neck arcuately upwardly toward the nose to form dual runner-like ribs. Each shoe has an outer surface 34 and an inner surface 35 diverging upwardly from surfaces 33 toward upper portion 30. The inner surfaces 35 converge and intersect with a bottom horizontal and longitudinally extending inverted valley surface 36 to form a lightening recess or longitudinal groove 37. Surface 36 near its end furthest from neck 4 slopes downwardly, as at 38, at an angle substantially parallel to an upwardly facing surface hereinafter described and intersects the bottom wearing surface 33 to form an entrance to groove 37.

The rear upper portion 30 of body 5 has two oppositely laterally-projecting spaced ears 40. The ears are positioned parallel to the vertical lugs 18 and are spaced therefrom, thereby providing a guide space 41 for the reciprocating cutter bar which carries the knives.

The cutting edge of each knife cooperates with a knife supporting portion on the body 5, generally referred to as the ledger surface or area. The ledger surfaces in the preferred embodiment are top surfaces 44 of two flanges 45 which extend in a direction away from the neck toward the nose. Each flange has an outer side surface 46 extending downwardly and inwardly to unite and merge with outer side surface 34 of lower portion 31.

Outer side surfaces 34 and 46 converge in a longitudinal direction from the neck toward the nose to form in combination with an adjacently mounted mower guard, a gathering means for the vegetation being cut.

Parallel to the outer surfaces 46 and extending in a direction away from the neck toward the nose, each flange has an inner surface 47 which intersects a horizontal, longitudinally extending, and upwardly facing surface 48. Surfaces 47 and 48 form a lightening recess 49.

Outer surfaces 46 are each provided with a longitudinally extending projection 50 having a top surface lying in the plane containing top surfaces 44 to form a continuation thereof. Each projection is subject to a broaching operation to have formed thereon outwardly facing serrations 52, which prevent the slipping of the legume or grasses when such growth is encountered by the knives. The point of juncture between the serrations 52 and surfaces 44 define cutting edges 53 which cooperate with the reciprocating cutting knife to secure a clean shear cut.

Figure 6:
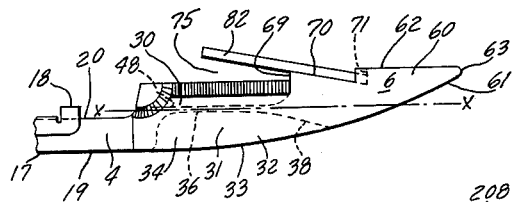
FIG. 6 is a fragmentary side elevation of the guard shown in FIGS. 1 and 2.

As mentioned briefly hereinabove, the guard finger comprises an elongated body having a nose disposed adjacent to the distal end forward of the ledger wearing surface. As shown best in FIGS. 1, 2, and 6, the nose 6 is tapered both laterally and vertically to form a generally-pointed forward portion 60 for engagement into the agricultural growth to be cut. The bottom surfaces 33 of shoes 32 merge to form bottom surface 61 on the nose. Bottom surface 61 has the same center of longitudinal curvature as bottom surfaces 33 and extends forwardly and upwardly through the horizontally extended plane X—X. A top nose surface 62, having a slight angle of inclination, extends from the midportion of the nose, as will be hereinafter described, intersects the continuation of bottom surface 61 to form in conjunction with outer surfaces 34 and 46, tip 63.

The forward upper portion of the body 5 has, extending from the ledger surface 44, transverse to surfaces 46, a generally vertical shoulder 69. The vertical distance between the edge of the shoulder and the ledger surface being slightly greater than the thickness of the cutting knife which is supported on the ledger surface. Intermediate the forward portion 60 and ledger surface 44 there is a guard lip receiving surface 70 extending forwardly and downwardly at an approximate angle of 10 degrees from the edge of shoulder 69. Surface 70 intersects a horizontally angled lip abutment shoulder 71 extending vertically downwardly from surface 62 at approximately the midportion of nose 6.

The guard lip 7 is polygonal, flat, and rigidly attached to surface 70, and extends rearwardly over the body 5 a predetermined distance to provide a protective shield portion which overhangs the ledger surfaces 44 and forms in combination with shoulder 69 and ledger surfaces 44, a slot 75 which receives a cutting knife. The lip 7 has two main longitudinally extending converging edges 82 and two horizontally angled edges 83 commencing in a dihedral angle at the front end of the lip transverse to edges 82. The edges 83 are complementary to the dihedral shaped lip abutment shoulder 71. Side edges 82 are so spaced relative to each other as to lie within the peripheric projection of surfaces 70 and 44 when the lip is affixed to the finger and edges 83 are in an abutting relation with shoulder 71.

The lip 7 is secured to the surface 70 by means, such as resistance welding. In a preferred method of welding, three button projections 84, 85, 86 are formed on the flat lip in the well-known manner near edges 83 with the button 84 at the forward apex of an isosceles triangular arrangement of the buttons. It is to be noted that three buttons are preferably used in order to obtain a weld sufficient in strength to resist the tear-out and shearing loads associated with guard lips. Further, three buttons provide a positive seat for the lip when the high pressures normally used in resistance welding are applied.

As previously mentioned, surface 36 slopes downwardly, as at 38. The guard lip receiving surface 70 and the forward surface portion 38 of surface 36 are substantially parallel so that the guard 1 and the lip 7 can be firmly gripped by the electrodes of a welding machine without slippage of the workpieces relative to each other or the machine.

In order to provide longer wearing surfaces for engagement with the cutting knife, the cutting edges 53 and ledger surfaces 44 in close proximity therewith are differentially hardened, as at outer portion 90. Such hardening is accomplished by use of the induction hardening process. Heretofore, a standard malleable mower guard casting, when heat treated accordingly, resulted in a deep penetration of the hardness gradient as a result of the required heating-cycle necessary to obtain a hardening response. Precise local surface hardening could not be controlled. By using pearlitic malleable iron in lieu of standard malleable iron, a cast mower guard having a preferred Rockwell-C hardness at the cutting edge on the order of 50 units and an inner body core of good ductility and toughness can be manufactured. Pearlitic malleable iron, in addition, has good impact resistance, a characteristic extremely desirable in cast mower guards.

The term "standard malleable," as applied to this invention, refers to iron having a carbon content in the range of approximately 2.30 to 2.60 percent, and approximately .90 to 1.50 percent silicon processed to a product comprising graphite in the form of temper carbon nodules in a matrix of ferrite. The term "pearlitic malleable" refers to an iron-silicon-carbon alloy of the above composition treated in such a manner that part of the carbon is present as temper carbon nodules of graphite and the remainder is intentionally retained in the combined form. The combined carbon appears in the matrix as one of the tempered decomposition products of austenite, e.g. pearlite, spheroidite, and tempered martensite. Both types of malleable just referred to are the products of different heat treatments of white iron.

Mower guards as disclosed herein were cast from a normal white iron analysis consisting of approximately 2.50 carbon, 1.25 silicon, and sufficient manganese to combine with the sulfur to form manganese sulfide, the balance iron. The following heat treatment schedule was adhered to:

The castings were heated over the critical temperature to dissolve the cementite microstructure at 1650° F. to 1850° F. for sufficient degree-hours, such as 1800° F. for 18–20 hours. After which the material was air cooled to below 1200° F. and thence reheated to approximately 1550° F. to maintain equilibrium. A rapid cooling by forced air from 1550° F. to under 1200° F. in less than 2 minutes provided a satisfactory method to recombine the desired percentage of carbon. This, of course, results in a harder than desired material. To soften the material, the castings were tempered for 5 hours at 1300° F. to change the quenched structure to a spheroidized pearlitic structure. If desired, the mower guard's cutting edges and ledger surface, in close proximity therewith, are differentially hardened as disclosed hereinabove.

The alloys and heat treating processes as set forth herein are described in the "Metals Handbook," vol. I, published by American Society for Metals in 1961.

The ledger surfaces 44, after a differential hardening treatment, vary in hardness inwardly from the cutting edges to an inner portion on the wearing surface, from 50 Rockwell-C to approximately 23 Rockwell-C. Thus, a wear surface of varying abrasive resistance is created. Such variation assumes maximum life at the cutting edge, since the material inwardly from the cutting edge along the ledger surface has a lower abrasive resistance which, as a result, may be worn away at a faster rate. This feature thereby provides for self-sharpening of the cutting edge; that is, the sharpnes of the cutting edge is maintained by the action thereon of the reciprocating knife when the mower is in use. This result was unobtainable heretofore with mower guards having a steel ledger plate or a case hardened ledger wearing surface.

Figure 7:
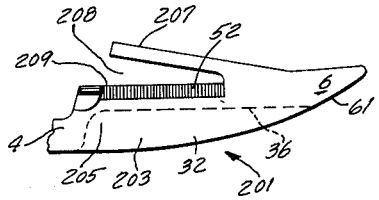
FIG. 7 is a fragmentary side elevation of the guard shown in FIG. 4.
Figure 8:
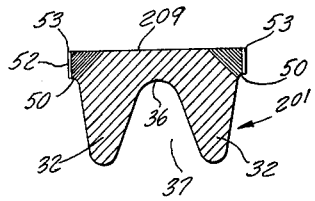
FIG. 8 is an enlarged elevation in transverse section taken along line VIII—VIII of the guard shown in FIG. 4.

With reference to FIGS. 4, 7 and 8, a heavy-duty mower guard 201 is shown, wherein corresponding elements will be denoted by the same numeral as used hereinabove and hereinafter. The heavy-duty guard 201 comprises a rear anchorage portion (not shown), a finger portion 203 including a neck 4, a body 205, and a forward nose 6, and a lip 207.

As in the lightweight guard 1, finger portion 203 is similarly connected to the anchorage portion by neck 4. The body 205 has two co-depending shoes 32 forming the groove 37. Since the finger portion 203 is of a unitary construction, the surface portion 38 of the lightweight guard is eliminated and bottom inverted valley surface 36 extends longitudinally forward toward the nose 6 until it intersects bottom surface 61.

Since either air-quenched or liquid-quenched pearlitic malleable castings have good machining characteristics, a slot 208 may be easily milled in the guard to form a ledger surface 209 and the overhanging lip 207. As with the lightweight mower guard 1, the projections 50 are broached to form vertical serrations 52. The cutting edges 53 are thermally treated to create in essence, a ledger surface having substantial parallel isogradient hardness lines diminishing in value as the distance from the cutting edges increases. Thus, by induction hardening, a hardness gradient of approximately ¼ inch in depth and having a Rockwell-C range of approximately 27 units, creates a differentially hardened surface which reduces the abrasiveness of the ledger surface in cooperation with the knife while forming a self-sharpening cutting edge. If desired, the flame hardening process may be employed to obtain local hardening.

Figure 9:
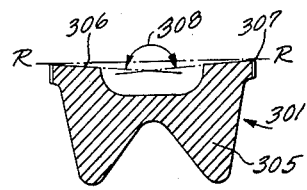
FIG. 9 is an elevation in transverse section of a modified guard conforming to the invention.

In FIG. 9 a modified guard finger 301 is shown in cross-section having a body 305 with tapered ledge surfaces 306 and cutting edges 307. The cutting edges, it will be noted, are contained in a horizontal plane R—R. Surfaces 306 slope laterally inwardly at an angle of approximately 1 degree. Thus, the sloping ledger surfaces 306 form a longitudinally extending dihedral angle 308 equal to 178 degrees. Preferably, this angle is maintained in excess of 160 degrees. If desired, cutting edges 307 may be hardened. It is evident that the cutting edges in this embodiment, when in cooperation with a knife, are self-sharpening.

Having thus described the invention, it is apparent that the construction of the cast mower guard finger of the double shoe type has a higher section-modulus about the Y—Y axis than the prior art guards. This, of course, lowers the fiber stresses along the outer surfaces 34 and 46. Furthermore, by providing the finger with dual shoes spaced from the Y—Y axis, the tensile or compression stresses which occur along the bottom wearing surface 33, as a result of a moment about the X—X axis, are reduced in magnitude when compared to the stresses occurring in a T-shaped structure.

The terms and expressions which have been employed are used as terms of description and not of limitation and there is no intention of excluding such equivalents of the invention described, or of the portions thereof, as fall within the scope of the claims.

What is claimed is:

1. A mower guard for use in a sickle-bar type mower having an anchorage portion and a guard finger including a neck and an elongated body having a nose spaced from said neck, said body comprising, in its normal operative position:
    a pair of laterally spaced co-depending shoes projecting convergently and forwardly from said anchorage portion and each having a downwardly facing, bottom wearing surface, said shoes defining therebetween a longitudinally extending groove having an inverted valley surface, said valley surface having a forward surface portion sloping at a slight angle of declination from said valley surface; and
    an upwardly facing lip supporting surface spaced adjacently rearward of said nose, at least portions of said lip supporting surface and said forward surface portion being in parallel coextensive relationship.

2. A self sharpening mower guard for use in a sickle-bar type mower comprising, in its normal operative position:
    a guard finger of ductile pearlitic malleable cast iron connected with and projecting forwardly from a rear anchor portion, said finger having a body affording shock resistance to the guard in its entirety;
    said body having an upwardly facing ledger wearing surface which in operation supports a reciprocating knife, and a pair of outer side surfaces intersecting with said ledger wearing surface to define an outer portion along each side extremity of said wearing surface which cooperates with said reciprocating knife; and
    said outer portion being differentially hardened to provide a hardened cutting edge along each side extremity of said wearing surface, and the hardness of the finger along said wearing surface decreasing gradually inwardly from each cutting edge to provide progressively more rapid wear rates along said ledger wearing surface inwardly from each of said edges to define an inner portion having a faster wearing rate than said cutting edges.

3. A mower guard according to claim 2 wherein:
    the hardness of said edges is greater than approximately 50 units on the Rockwell-C hardness scale and the hardness progressively decreases along said ledger wearing surface inwardly from each cutting edge to approximately 23 units on the Rockwell-C hardness scale.

4. A cast iron mower guard for a sickle-bar type mower comprising, in its normal operative position:
    a guard finger connected with and projecting forwardly from a rear anchor portion;
    said guard finger having an upwardly facing ledger wearing surface and a pair of outer side surfaces intersecting with said ledge wearing surface to define a cutting edge along each side extremity of said wearing surface; and
    a pair of laterally spaced co-depending shoes converging in said forward direction and each having a downwardly facing bottom wearing surface opposite said ledger surface intersecting with said outer side surface to define a centrally located, longitudinally extending groove.

5. A mower guard according to claim 4 wherein:
    said finger further comprises a nose disposed adjacent the distal end forward of said ledger wearing surface;
    a rearwardly inclined upwardly facing lip supporting surface intermediate said ledger wearing surface and said nose, said supporting surface intersecting said nose to provide a transverse horizontally angled lip abutment shoulder;

a lip securely fastened to said supporting surface and extending rearwardly from said shoulder toward said anchor portion at a predetermined distance to provide a protective shield portion that overhangs said wearing surface thereby forming a slot to receive a reciprocating knife; and said co-depending shoes to define an inverted valley surface therebetween having a forward surface portion approximately parallel to said supporting surface.

6. A cast iron mower guard for a sickle-bar type mower comprising in its normal operative position:

a guard finger connected with and projecting forwardly from a rear anchor portion;

said guard finger having a pair of laterally spaced, upwardly facing, and longitudinally extending flanges providing a longitudinally divided ledger surface and a pair of outer side surfaces intersecting with said ledger surface to define a cutting edge along each side extremity of said ledger surface; and a pair of laterally spaced co-depending shoes converging in said forward direction and each having a downwardly facing bottom wearing surface opposite said ledger surface intersecting with said outer side surfaces to define a centrally located, longitudinally extending groove.

7. A self sharpening mower guard for use in a sickle-bar type mower comprising, in its normal operative position:

a guard finger of ductile pearlitic malleable cast iron connected with and projecting forwardly from a rear anchor portion, said finger having a body affording a shock resistance characteristic to the guard in its entirety;

said body having an upwardly facing ledger wearing surface which, in operation, supports a reciprocating knife, and a pair of outer side surfaces intersecting with said ledger wearing surface to define an outer portion along each side extremity of said wearing surface adapted to cooperate with said knife to effect cutting action;

said outer portion being differentially hardened to provide a hardened cutting edge along each side extremity of said wearing surface, and the hardness of the finger along said wearing surface decreasing gradually inwardly from each cutting edge to provide progressively more rapid wear rates along said ledger wearing surface inwardly from each of said edges to define an inner portion having a faster wearing rate than said cutting edges; and a pair of laterally spaced co-depending shoes converging in said forward direction and each having a downwardly facing bottom wearing surface opposite said ledger wearing surface intersecting with said outer side surfaces to define a centrally located, longitudinally extending groove.

8. A self-sharpening mower guard for use in a sickle-bar type mower comprising, in its normal operative position:

a guard finger of ductile pearlitic malleable cast iron having a hardness of approximately 23 units on the Rockwell-C hardness scale connected with and projecting forwardly from a rear anchor portion, said finger having a body affording a shock resistant characteristic to the guard in its entirety;

said body having an upwardly facing ledger wearing surface which, in operation, supports a reciprocating knife, and a pair of outer side surfaces intersecting with said ledger wearing surface to define an outer portion along each side extremity of said wearing surface which cooperates with said reciprocating knife; and said outer portion being differentially hardened approximately ¼ inch in depth to provide a hardened cutting edge along each side extremity providing said surface with variable abrasion resistance decreasing inwardly from each cutting edge to define a range of hardness, as measured by the Rockwell-C hardness scale, varying from approximately 23 units along an inner portion of said wearing surface to at least approximately 50 units along said cutting edge.

References Cited by the Examiner
UNITED STATES PATENTS

| | | | |
|---|---|---|---|
| 356,357 | 1/1887 | Folliott | 56—310 |
| 856,814 | 6/1907 | Scofield | 56—310 |
| 2,654,987 | 10/1953 | Mills et al. | 56—310 |

ABRAHAM G. STONE, *Primary Examiner.*

RUSSELL R. KINSEY, T. GRAHAM CRAVER,
*Examiners.*